United States Patent [19]
DeGroot et al.

[11] Patent Number: 6,003,494
[45] Date of Patent: Dec. 21, 1999

[54] SPARK ADVANCE MODIFIER BASED ON A FUEL MODIFIER

[75] Inventors: Kenneth P. DeGroot, Macomb Township; Michael J. Reale, Royal Oak; Bruce H. Teague, Grosse Pointe Park; Raymond J. Sullivan, Royal Oak; Dennis A. Soltis, Lake Orion, all of Mich.

[73] Assignee: Chrysler Corporation, Auburn Hills, Mich.

[21] Appl. No.: 09/144,041

[22] Filed: Aug. 31, 1998

[51] Int. Cl.[6] .......................................................... F02P 5/00
[52] U.S. Cl. ................................. 123/406.24; 123/406.45
[58] Field of Search ......................... 123/406.24, 406.45, 123/406.47, 406.64; 701/111

[56] References Cited

U.S. PATENT DOCUMENTS

| 4,703,732 | 11/1987 | Wineland et al. ...................... 123/416 |
| 4,984,854 | 1/1991 | Feller et al. ............................ 73/117.3 |
| 5,003,944 | 4/1991 | Moote et al. ............................ 123/299 |
| 5,113,827 | 5/1992 | Vincent .................................... 123/417 |
| 5,435,285 | 7/1995 | Adams et al. ........................... 123/492 |
| 5,544,640 | 8/1996 | Thomas et al. ......................... 123/689 |
| 5,596,975 | 1/1997 | Thomas et al. ......................... 123/686 |
| 5,634,868 | 6/1997 | Weber et al. ............................ 477/107 |
| 5,809,969 | 9/1998 | Flaschetti et al. ...................... 123/436 |
| 5,947,008 | 9/1999 | DeGroot et al. ........................ 123/436 |

*Primary Examiner*—Tony M. Argenbright
*Assistant Examiner*—Arnold Castro
*Attorney, Agent, or Firm*—Mark P. Calcaterra

[57] ABSTRACT

A method is provided for controlling spark advance based on a fuel modifier. Initially, engine fueling is reduced according to a known dynamic crankshaft fuel control (DCFC) methodology. As a result, the engine tends to run rougher. In response, spark advance is varied based on the overall fuel multiplier reduction from the DCFC methodology. For instance, a look-up table, or mathematical function based on the DCFC multiplier can be utilized as the basis for the spark advance.

4 Claims, 1 Drawing Sheet

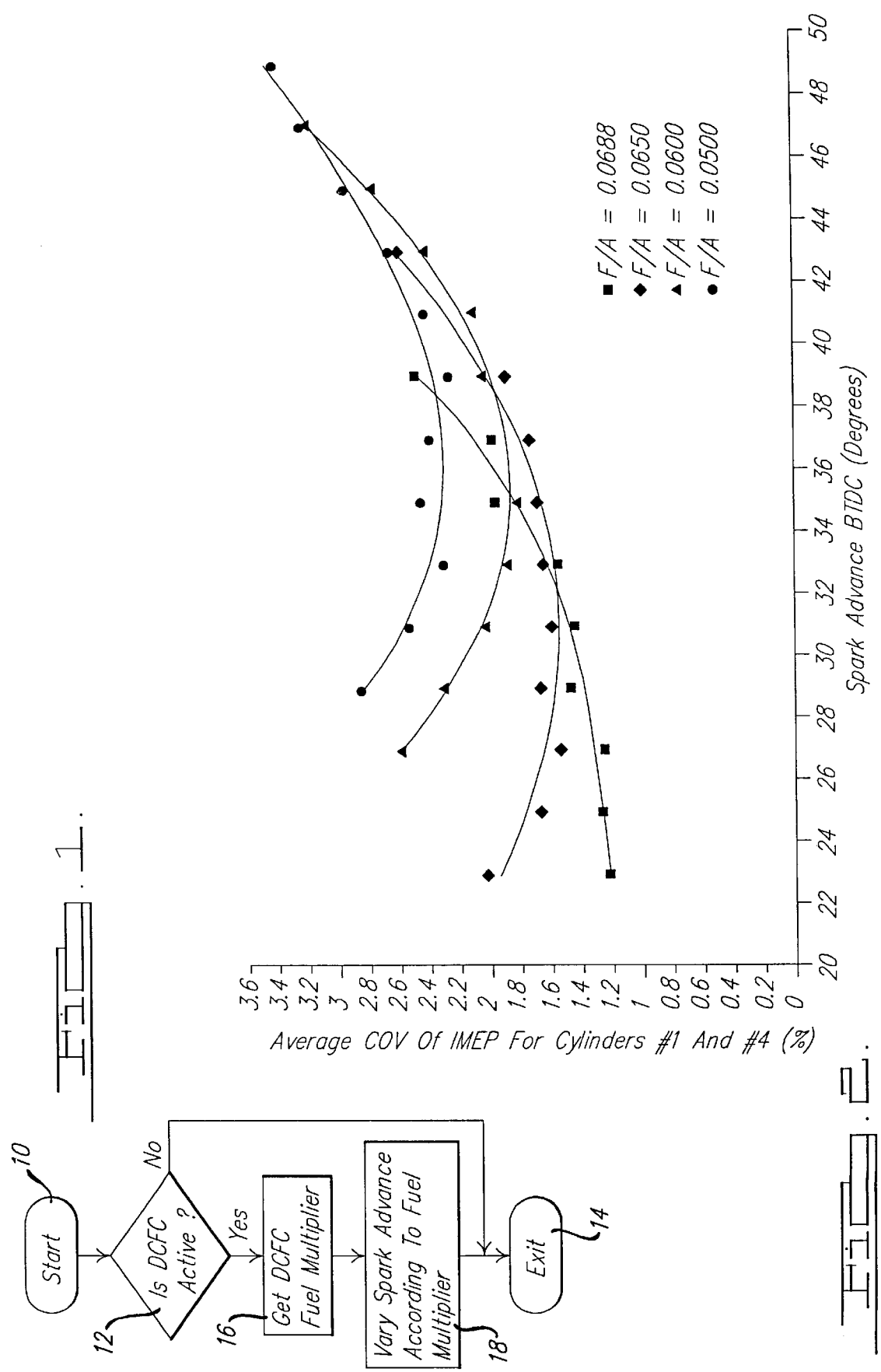

SPARK ADVANCE MODIFIER BASED ON A FUEL MODIFIER

BACKGROUND OF THE INVENTION

1. Technical Field

The present invention generally relates to engine control systems for automotive vehicles and, more particularly, to a method of controlling engine stability based on a fuel modifier.

2. Discussion

Recent advances in automotive vehicle engine control systems have led to the development of dynamic crankshaft fueling control systems. For instance, commonly assigned U.S. Pat. No. 5,809,969, entitled "Method for Processing Crankshaft Speed Fluctuations for Control Applications" issued Sep. 22, 1998, which is hereby expressly incorporated by reference herein, discloses one such dynamic fueling control system. According to this system, the amount of fuel delivered to the engine is reduced to obtain superior catalyst light off and engine out hydrocarbon reduction. However, as the fuel to air ratio is leaned out, the engine's burn rate is slowed down and engine stability becomes rougher. Such engine roughness is quantified in the art as the coefficient of variance of torque or COV. Thus, with the reduction of fuel, overall drivability of the vehicle becomes harder. From a calibration stand-point, this trend is particularly noticeable when 1300 drivability index fuel is used.

In view of the foregoing, it would be desirable to provide a system for use in conjunction with a dynamic crankshaft fuel control system to reduce COV and engine roughness.

SUMMARY OF THE INVENTION

The above and other objects are provided by a method of controlling spark advance based on a fuel modifier. Initially, engine fueling is reduced according to a known dynamic crankshaft fuel control (DCFC) methodology. As a result, the engine tends to run rougher with a higher COV. In response, spark advance is varied based on the overall fuel multiplier reduction from the DCFC methodology. For instance, a look-up table, or mathematical function based on the DCFC multiplier can be utilized as a basis for the spark advance.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart depicting the methodology of improving engine stability using spark advance modification based on a fuel modifier according to the present invention; and FIG. 2 is a graph illustrating the relationship of spark advance and COV according to the present invention.

DETAILED DESCRIPTION OF THE PREFERRED EMBODIMENTS

The present invention is directed towards improving engine stability and drivability in a motor vehicle equipped with a dynamic crankshaft fuel control (DCFC) system. More particularly, the present invention adjusts the engine spark advance according to a fuel modifier from the DCFC system. As such, the engine's burn process is enhanced and engine stability is improved.

Referring now to the drawing figures, FIG. 1 illustrates a method of controlling spark advance based on a fuel modifier according to the present invention. The methodology starts at bubble 10 and falls through to decision block 12. In decision block 12 the methodology determines if the vehicle's DCFC system is active. If not, the methodology advances to bubble 14 and exits the routine pending a subsequent execution thereof. However, if the DCFC system is active at decision block 12 the methodology advances to block 16.

In block 16 the methodology retrieves the DCFC fuel multiplier value from a memory location such as the engine control unit. From block 16 the methodology advances to block 18. In block 18, the methodology varies the spark advance according to the DCFC fuel multiplier retrieved at block 16. For example, the spark advance amount at block 18 can be determined from a look-up table such as:

| DCFC Fueling Multiplier | Spark Advance |
| --- | --- |
| −10% | +2 |
| −15% | +4 |
| −25% | +6 | or, according to a mathematical function such as:

Spark Advance=Total Spark * (Derived Coefficient),

Where:

Derived Coefficient=Coefficient of Variance of indicated main effective pressure (COV).

From block 18 the methodology continues to bubble 14 where it exits the routine pending a subsequent execution thereof. It should also be noted that while the above table only shows increases in spark advance, spark retardation is also contemplated to be within the scope of the present invention.

Referring now to FIG. 2, a graphic illustration of the relationship of average COV vs. spark advance is illustrated. The graph includes four different fuel to air ratio scenarios. As can be seen, as the fuel to air ratio changes, spark advance must be modified (increased or decreased) to optimize COV.

Thus, the present invention provides a method of controlling spark advance according to a fuel modifier from a DCFC system. As such, engine roughness commonly experienced with DCFC systems is reduced. Accordingly, COV is reduced and engine stability is enhanced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of improving the drivability of a vehicle equipped with a dynamic crankshaft fuel control system comprising:

determining if said dynamic crankshaft fuel control system is active;

obtaining a fuel multiplier from said dynamic crankshaft fuel control system if said system is active; and varying a spark advance setting of an engine in said vehicle according to said fuel multiplier.

2. The method of claim 1 wherein said spark advance setting is acquired from a look-up table.

3. The method of claim 1 wherein said spark advance setting is calculated using a preselected formula.

4. A method of improving the drivability of a vehicle equipped with a dynamic crankshaft fuel control system through the use of spark advance comprising:

determining if said dynamic crankshaft fuel control system is active;

obtaining a fuel multiplier from said dynamic crankshaft fuel control system if said system is active;

looking up a spark advance value corresponding to said fuel multiplier; and setting a timing of an engine of said vehicle according to said spark advance value.

\* \* \* \* \*